US 8,254,263 B2

(12) United States Patent
Ashwood Smith et al.

(10) Patent No.: US 8,254,263 B2
(45) Date of Patent: Aug. 28, 2012

(54) METHOD AND APPARATUS FOR SIMPLIFYING THE COMPUTATION OF ALTERNATE NETWORK PATHS

(75) Inventors: Peter Ashwood Smith, Hull (CA); Hong Zhang, Kanata (CA); Guoli Yin, Nepean (CA)

(73) Assignee: Rockstar Bidco, LP, New York, NY (US)

(*) Notice: Subject to any disclaimer, the term of this patent is extended or adjusted under 35 U.S.C. 154(b) by 1348 days.

(21) Appl. No.: 11/410,747

(22) Filed: Apr. 25, 2006

(65) Prior Publication Data

US 2007/0248016 A1   Oct. 25, 2007

(51) Int. Cl.
    H04L 12/26    (2006.01)
(52) U.S. Cl. .................................. 370/238; 370/235
(58) Field of Classification Search .............. 370/238, 370/230, 352, 355, 392, 395.2; 726/1, 17
    See application file for complete search history.

(56) References Cited

U.S. PATENT DOCUMENTS

| 4,991,204 | A  | * | 2/1991  | Yamamoto et al. | 379/221.01 |
|-----------|----|---|---------|-----------------|------------|
| 5,317,566 | A  | * | 5/1994  | Joshi           | 370/238    |
| 5,953,312 | A  | * | 9/1999  | Crawley et al.  | 370/218    |
| 6,067,572 | A  | * | 5/2000  | Jensen et al.   | 709/241    |
| 6,331,986 | B1 | * | 12/2001 | Mitra et al.    | 370/468    |
| 6,498,778 | B1 | * | 12/2002 | Cwilich et al.  | 370/216    |
| 6,633,544 | B1 | * | 10/2003 | Rexford et al.  | 370/238    |
| 6,667,956 | B2 | * | 12/2003 | Beshai et al.   | 370/238    |
| 6,778,502 | B2 | * | 8/2004  | Ricciulli       | 370/238    |
| 7,180,864 | B2 | * | 2/2007  | Basu et al.     | 370/238    |
| 7,280,481 | B2 | * | 10/2007 | Rong            | 370/238    |
| 7,280,526 | B2 | * | 10/2007 | Fleischer et al.| 370/351    |
| 7,327,683 | B2 | * | 2/2008  | Ogier et al.    | 370/236    |
| 7,362,709 | B1 | * | 4/2008  | Hui et al.      | 370/237    |
| 7,633,873 | B1 | * | 12/2009 | Kohler et al.   | 370/238    |
| 7,656,792 | B2 | * | 2/2010  | Zhang et al.    | 370/228    |
| 2002/0141346 | A1 | * | 10/2002 | Garcia-Luna-Aceves et al. | 370/238 |
| 2003/0177263 | A1 | * | 9/2003  | Robinson        | 709/239    |
| 2004/0004938 | A1 | * | 1/2004  | Buddhikot et al.| 370/238    |
| 2004/0073700 | A1 | * | 4/2004  | Chaudhuri       | 709/239    |
| 2005/0073958 | A1 |   | 4/2005  | Atlas et al.    |            |
| 2005/0088965 | A1 | * | 4/2005  | Atlas et al.    | 370/216    |
| 2005/0254430 | A1 | * | 11/2005 | Clark et al.    | 370/241    |
| 2006/0045024 | A1 | * | 3/2006  | Previdi et al.  | 370/254    |
| 2007/0038767 | A1 | * | 2/2007  | Miles et al.    | 709/230    |

(Continued)

OTHER PUBLICATIONS

RFC 1322 "A Unified Approach to Inter-Domain Routing" published on May 1992 by the Network Working Group. See whole document.*

(Continued)

Primary Examiner — Michael J Moore, Jr.
(74) Attorney, Agent, or Firm — Withrow & Terranova, PLC

(57) ABSTRACT

An alternate path calculation process may be terminated after considering some of a source node's neighbors and without considering each of its neighbors, to reduce the amount of processing required to perform the alternate path calculations. The neighbors may be ranked according to the number of alternate paths that the neighbor has historically been able to provide on the network. The influence of historical success or failure may degrade over time so that the rankings may be adjusted to reflect changes in network topography. A given source node, when computing alternate paths through the network, may preferentially select neighbors to perform alternate path calculations on historically higher scoring nodes before performing calculations on historically lower scoring nodes. Several different criteria may be used to stop the alternate path calculation process before considering all neighbors. The neighbors may be loop free neighbors or U-turn neighbors.

18 Claims, 5 Drawing Sheets

U.S. PATENT DOCUMENTS

2008/0056137 A1* 3/2008 Ravindran et al. ............ 370/238
2008/0232347 A1* 9/2008 Chao et al. .................... 370/351

OTHER PUBLICATIONS

C. D'Souza, Reliable Alternate Paths for IP Destinations (RAPID), white paper 2004 (11 pages).

C. Martin, et al., U-turn Alternates for IP/LDP Fast-Reroute, Internet Engineering Task Force (IETF) Internet Draft (ID), draft-martin-isis-local-protect-cap-01, Oct. 24, 2004 (7 pages).

A. Atlas, U-turn Alternates for IP/LDP Fast-Reroute, IETF ID, draft-atlas-isis-local-protect-cap-01, Oct. 24, 2004 (7 pages).

* cited by examiner

METHOD AND APPARATUS FOR SIMPLIFYING THE COMPUTATION OF ALTERNATE NETWORK PATHS

BACKGROUND OF THE INVENTION

1. Field of the Invention

The present invention relates to communication networks and, more particularly, to a method and apparatus for simplifying the computation of alternate network paths in a routed network.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements. Protocol Data Units will also be referred to herein as packets.

There are several different types of network routing protocols, one class of which is commonly referred to as link state routing protocols. Link state routing protocols assign cost metrics to each link on the network, and the routers advertise the links and costs through the use of link state advertisements. The routers collect the link state advertisements and build a link state database containing information associated with links on the network. This network view enables the routers to compute lowest cost paths through the network to intended destinations. These calculations are performed in advance and then programmed into the data plane of the network element. In operation, when a packet arrives, the data plane will automatically forward the packet over the lowest cost path toward its intended destination. Several examples of routing protocols that operate in this manner include Intermediate System to Intermediate System (IS-IS) and Open Shortest Path First (OSPF), although other link state routing protocols exist and may be developed as well.

Network failures, such as link failures and node failures, may occur in a communication network. When a failure occurs, traffic that is intended to flow through the failure must be routed around the failure so that it is able to traverse the network. Many different ways of handling network failures have been devised over the years. For particular types of traffic, it is generally considered desirable or necessary to enable traffic to be switched to an alternate path with 50 milliseconds of failure on the primary path, so that real time traffic being carried by the network is not affected by the failure. While this is generally possible using physical layer protection switching, such as by switching traffic to a protection path using SONET equipment, it would be advantageous to be able to provide this type of protection at the routing layer.

When a failure occurs in a network implementing a link state routing protocol, the local router will react to the failure by generating and flooding new routing updates to other routers in the network, perhaps after a hold-down delay. Upon receipt of the routing update, all the routers in the network will re-compute routes through the network based on the new network topology. These routers will then load the revised forwarding tables into the forwarding hardware. The convergence time for this process to complete may last for several seconds. Accordingly, use of the link state routing protocol to provide sub-50 ms failure recovery is generally not tenable.

One relatively recent way to provide fast failover to an alternate path is through the use of pre-computed alternate paths. For example, when the router initially computes a path to a destination, the router may also assume a failure on its primary path and compute an alternate path to the destination at the same time. The alternate path may then be programmed into the data plane of the network element so that, if a failure on the primary path occurs, the alternate path may be used to forward traffic temporarily while new primary paths are being computed.

FIG. 1 shows a simplified example of a network 10 including six nodes 12 interconnected by links 14. The cost of the links in this figure will be assumed to be symmetric, and are shown as numbers on the links. In an actual implementation, the network may be much larger and include a larger number of nodes. In this example, traffic is flowing from R1 to R6. Initially, a shortest path 20 from R1 to R6 will be through nodes R2 and R3, since this path has a cost of 4.

FIG. 2 shows the network of FIG. 1 in which there has been a failure on the link between R2 and R3. Although R2 will sense the failure, R1 will not know of the failure and will continue to send traffic to R2 to be forwarded to R6. To enable R2 to continue to forward traffic to R6, R2 will have pre-computed an alternate path through the network and have programmed that alternate path into its data plane. For example, in the example shown in FIG. 2, the pre-computed alternate path may be to transmit the data to R4, which may then transmit the data to the destination (R6) over its own shortest path.

The failure on link 2 will eventually be advertised by R2 using a standard Link State Advertisement (LSA), so that each of the nodes on the network may recompute paths through the network using the updated network information. These new paths will then be used by the network elements in a standard manner. For example, since the path from R1 to R6 via R4 and R5 has a cost of 6, R1 will stop sending R2 traffic intended for R6 once the new paths are computed and installed by the network elements. Having pre-computed alternate paths, however, enables the network elements to continue forwarding traffic to intended destinations while the network nodes recomputed new primary paths through the new network topography.

To determine which paths are able to be used to forward traffic in this manner, each router must determine which neighbors are loop free. In the networks shown in FIGS. 1 and 2, R4 is loop free because the distance from R4 to R6 is less than the distance from R4 to R2 plus the distance from R2 to R6. Stated another way, when R2 sends traffic to R4 to be forwarded to R6, R2 needs to know that the shortest path from R4 to R6 does not require R4 to forward traffic back through R2. Since R4 will not know of the failure on the link from R2 to R3, having R4 return the traffic to R2 would cause a routing loop to occur, and would defeat the purpose of trying to send out the traffic to R6 via an alternate path through the network. Accordingly, to enable alternate path routing to be enabled, each router must determine which of its neighbors has a lowest cost path to a particular destination that does not cause traffic to be forwarded back through it, i.e., the nodes must determine which neighboring routers are on loop free paths to the intended destination.

Additionally, the nodes may preferentially select from available loop free neighbors for example by determining which neighbor's shortest path to the destination avoids the immediate downstream node R3. Selection of alternate paths is described in greater detail in U.S. Patent Application Publication No. US2005/0073958A1, the content of which is hereby incorporated herein by reference.

FIG. 3 shows an example where it will be assumed that R2 does not have any loop-free neighbors. In this case, R2 may be able to use router R1 as its alternate path if router R1 is configured to enable U-turns to occur in the event of a failure on the network. Enabling U-turns of this nature is also described in greater detail in U.S. Patent Application Publication No. US2005/0073958A1, the content of which is hereby incorporated herein by reference. Essentially, U-turns enable the number of source/destination pairs that are protected on the network to be increased. To enable U-turns, R1 must be capable of breaking U-turns, and must have a loop free node-protecting alternate path to reach the destination.

To enable a node to determine which neighbor should be used as the first hop in an alternate path to a particular destination, the node will run an algorithm such as the well-known Dijkstra algorithm rooted at the neighbor, to enable it to determine the shortest path from the neighboring node to the destination. This must be done for each neighbor. As the number of neighboring nodes increases, the processing requirements to compute the alternate paths increase significantly. Accordingly, it would be advantageous to provide a way to simplify the manner in which a reliable alternate path could be determined from a given node to an intended destination.

SUMMARY OF THE INVENTION

An alternate path calculation process may be terminated after considering some of the neighbors and without considering each of the neighbors, to reduce the amount of processing required to perform the alternate path calculations. Accordingly, a given node may obtain a set of alternate paths through the network by performing the requisite Dykstra or other calculations on fewer than all neighboring nodes, to thereby reduce the computational complexity associated with finding alternate paths through the network. The neighbors may be selected based on the historical ability of that node to reach a number of destinations. For example, neighbors may be ranked according to their ability to reach destinations based on how many destinations those neighbors were able to reach during previous calculations. The historical information may be used to provide a probability score for each neighbor. The influence of historical success or failure may degrade over time so that the rankings may be adjusted to reflect changes in network topography.

A given source node, when computing alternate paths through the network, may preferentially select neighboring nodes with high probability scores initially, so that it performs alternate path calculations on historically higher scoring nodes before performing calculations on historically lower scoring nodes. Over time, the subset of nodes that must be considered by a node to compute alternate paths to the destination will be reduced so that, ultimately, a given node will need to perform computations on fewer than all of the neighboring nodes to obtain a set of alternate paths to its destinations. Optionally, other criteria may be used to determine when the alternate path calculation process should be stopped before a complete set of paths is determined.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

In a network with a large number of neighbors for each node, it may be possible to provide an alternate path to almost all destinations in the network using on the order of five or six neighbors as alternates. Accordingly, a given node may obtain an alternate path through the network to all or most of its destinations by performing the requisite Dykstra or other calculations only for these selected nodes, rather than for all neighboring nodes. While this process may provide larger benefits in a network having a large number of neighbors for each node, the invention is not limited in this manner as it may also be used in other networks having fewer neighbors per node. By reducing the number of nodes that are considered as possible alternates, and only performing alternate processing on those nodes with a higher probability of being able to function as an alternate path to a larger number of destinations, the network element is able to reduce significantly the computational complexity required to find alternate paths through the network. The neighbors to be considered may be selected by considering the relative historical ability of a neighbor to serve as a first hop on an alternate path to a relatively larger number of network destinations.

Figure 1:
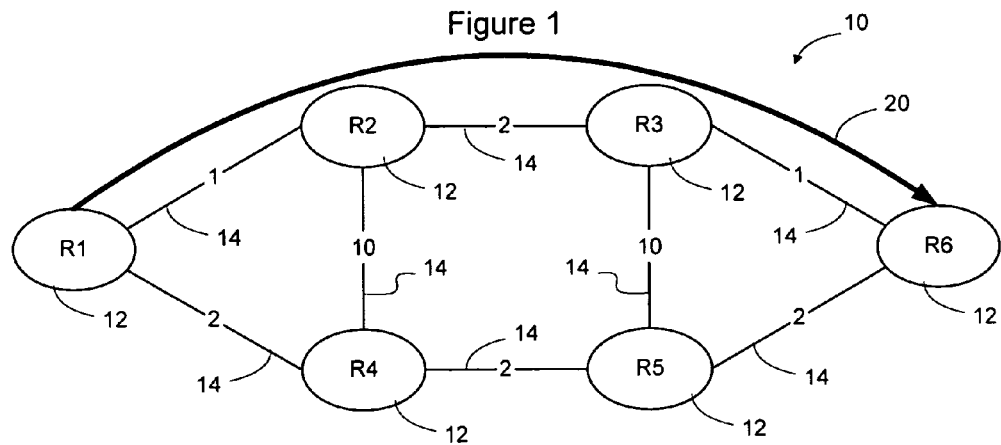
FIG. 1 is a functional block diagram of a portion of an example communication network showing an initial path through the network.
Figure 2:
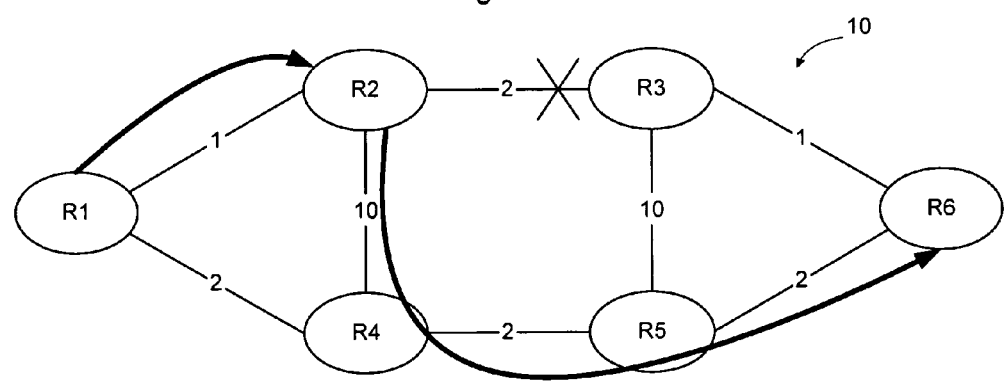
FIG. 2 is a functional block diagram of the network of FIG. 1 showing an alternate path through the network via a neighboring node.
Figure 3:
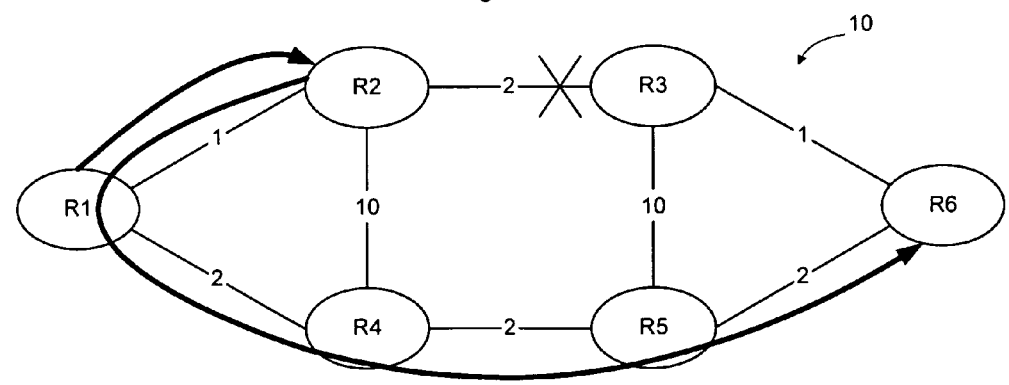
FIG. 3 is a functional block diagram of the network of FIG. 1 showing an alternate path through the network that relies on a U-turn.
Figure 4:
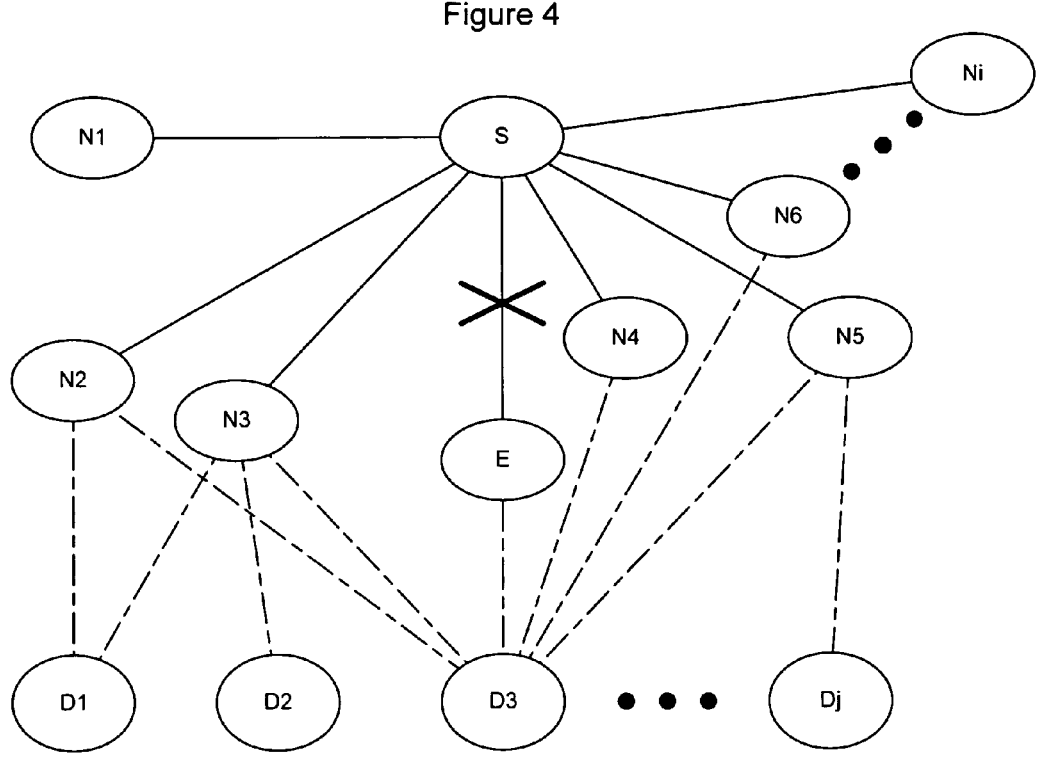
FIG. 4 is a functional block diagram of a network in which a sending node has a large number of neighboring nodes.
Figure 5:
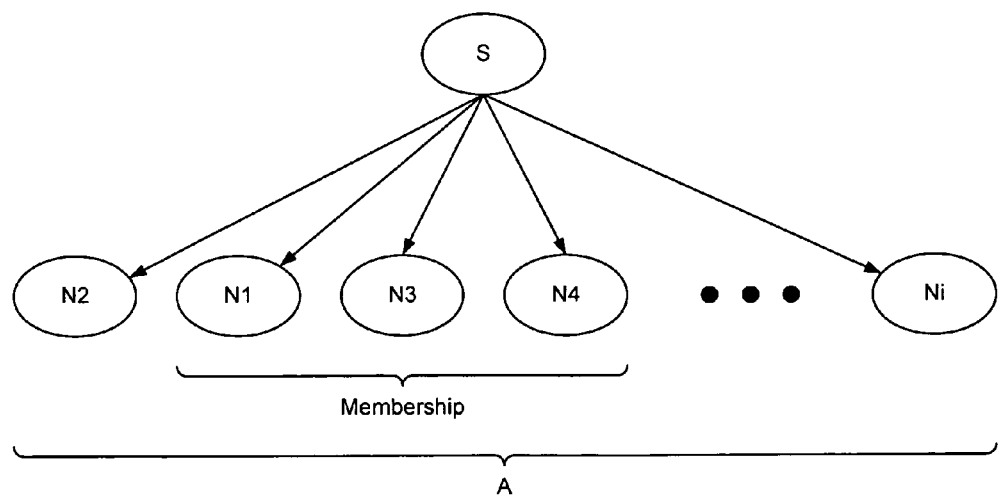
FIG. 5 is a functional block diagram of a portion of a network illustrating the large number of neighboring nodes.

FIG. 4 illustrates a network in which a large number of neighbors N1-Ni of source node S are potential candidates as alternates to enable traffic through source node S to be transmitted to the intended destination nodes D1-Dj. In the example shown in FIG. 4, neighbors N2, N3, and N5 all are capable of serving as alternates to more than one destination, while neighbors N4 and N6 are only capable of serving as an alternate to a single destination. Additionally, one or more of nodes N1-Ni may be a U-turn neighbor.

As shown in FIG. 4, some neighbors may be better alternates than other neighbors, since those neighbors are more likely to be able to serve as an alternate for node S. Accordingly, if S is seeking to find an alternate path to each of its destinations, it may do so by considering a subset of its neighbors, N2, N3, and N5, and thereby reduce the computational complexity associated with computing alternate paths. For example, if source node S were to perform alternate path calculations using neighbors N2, N3, and N5 first, it would be able to stop looking for alternate paths after considering fewer than all of its neighboring nodes to thereby accelerate the process of finding alternate paths to its destinations.

According to an embodiment of the invention, the node S is able to preferentially select neighbors that have historically provided alternate paths for a larger number of destinations (relative to their peers), and perform alternate path calculations on those neighbors first before considering other neighbors. The process will continue until the source node is able to find an alternate path to all destinations or until the process is stopped for another reason. This enables the source node S to reduce the computational complexity associated with selecting alternate paths, since the source node S is able to reduce the number of nodes on which alternate path calculations are required to be performed. As alternate path calculations are performed for the neighboring nodes, the number of destinations reachable via a particular neighbor will be counted and used to update the rankings of the neighbors.

According to an embodiment of the invention, a small historically good subset of neighbors is developed over time by assigning probabilities to each loop free neighbor of S, and adjusting these probabilities each time S is required to compute new alternates. Initially, when the source node doesn't have any history as to which neighbors are able to provide alternate paths to destinations, the source node S may choose a subset of neighbors at random. Alternatively, the source node may perform alternate path calculations on all of the neighbors during the initial alternate path calculation process, to obtain a ranked set of neighbors. The invention is not limited to the particular manner in which the initial ranked list of neighbors is created.

After the first time alternate paths are computed, the neighbors in the list are adjusted up or down depending on how many destinations they were alternates for. Over time, neighbors that are alternates for a large number of destinations will be preferentially selected over neighbors that are alternates for a smaller number of destinations. This preferentially ranked list may then be used by the node S to preferentially process those neighbors higher on the list before processing other neighbors when looking for alternate paths to the destinations. In this manner, the node will perform alternate path calculations on only a subset of the total number of neighbors to thereby reduce the complexity of the required computations. The ability to reduce the number of neighboring nodes that is considered when computing alternative paths reduces the computational complexity.

For example, assume that a given source node S has 100 destinations, and a total of 25 neighbors. It will be assumed for this example that the source node S does not care about picking the absolute best alternate to forward traffic to a given destination, but rather only wants to find an alternate for each destination, or at least to as many destinations as possible.

Finding an alternate path to the destinations, regardless of whether the alternate path is the best possible alternate path, represents a trade-off between processing efficiency and network efficiency. Given the fact that the alternate paths may never be used, or may be used only for a very short period of time while the network is converging on the new network topography, this trade-off may be reasonable. Specifically, during this short period, it may not be critical that the alternate path be the shortest alternate path, as long as traffic is able to reach its destinations without looping back to the source node S.

Initially, since source node S doesn't know which neighbor is able to forward traffic to which destination, each neighbor will be given a weighting of $\frac{1}{25}$, since there are 25 neighbors and each neighbor is to be weighted equally. Over time, these weightings will change as the source node is able to determine which of the neighbors are able to provide alternate paths to greater numbers of destinations. For example, assume that one of the neighbors (N1) is able to serve as a backup for 50 of the destinations, and another of the neighbors (N2) is able to serve as a backup for only 2 of the destinations. In a subsequent computation, the neighbor N1 will be weighted higher than the other neighbor N2. Specifically, neighbor N1 would be expected to be chosen with a probability higher than $\frac{1}{25}$, possibly as high as $\frac{1}{2}$ ($\frac{50}{100}$). Likewise, neighbor N2 would be expected to be chosen with a probability lower than $\frac{1}{25}$, possibly as low as $\frac{1}{50}$ ($\frac{2}{100}$).

At start-up, the node may select neighbors at random and build a ranked list of neighbors over time. Alternatively, when the node first performs an alternate path calculation process, the node may consider all of its neighbors to generate a ranked list of neighbors. The node may then use the ranked list of neighbors when it is subsequently necessary to compute alternate paths, so that the subsequent alternate path calculations may be accelerated. Other ways of initially obtaining ranking information about the neighbors may be used as well.

The weighting to be provided to a particular neighbor may be configured to tend back toward equal probability over time. Stated another way, the contribution that past success or failure has on a subsequent computation may be set to decrease over time, to enable the rankings of the neighbors to change as network conditions change. Optionally, the source node may occasionally perform a complete alternate path calculation on all neighbors to obtain a current/updated list of ranked neighbors.

The source node may rank neighbors and process the neighbors starting at the top of the list, or may rank the neighbors and select an initial subset of the neighbors for initial processing. When the source node uses a subset concept, the source node will initially select a group of neighbors, such as 5 or 6 neighbors, and perform alternate path calculations on those neighbors in the subset. If the subset has provided a complete set of alternate paths to the source node's destinations, the computations may stop. If not, the source node may consider nodes outside of the subset until a complete set of alternate paths has been determined.

The source node may also be configured to stop the alternate path calculation process once a particular threshold has been met. For example, the source node may be configured to stop the alternate path calculation process once alternate paths to a particular percentage of destinations (other than 100%) have been computed. For example, the source node may stop computations once alternate paths have been found for 95% of the destination nodes. Alternatively, the source node may stop computations once the amount of CPU time has exceeded a particular threshold. Still alternatively, the source node may stop computations once it appears that the number of alternate paths being found to new destinations for each neighbor being considered drops below a threshold. Other stop calculation criteria may be used to stop calculation of alternate paths as well.

Figure 6:
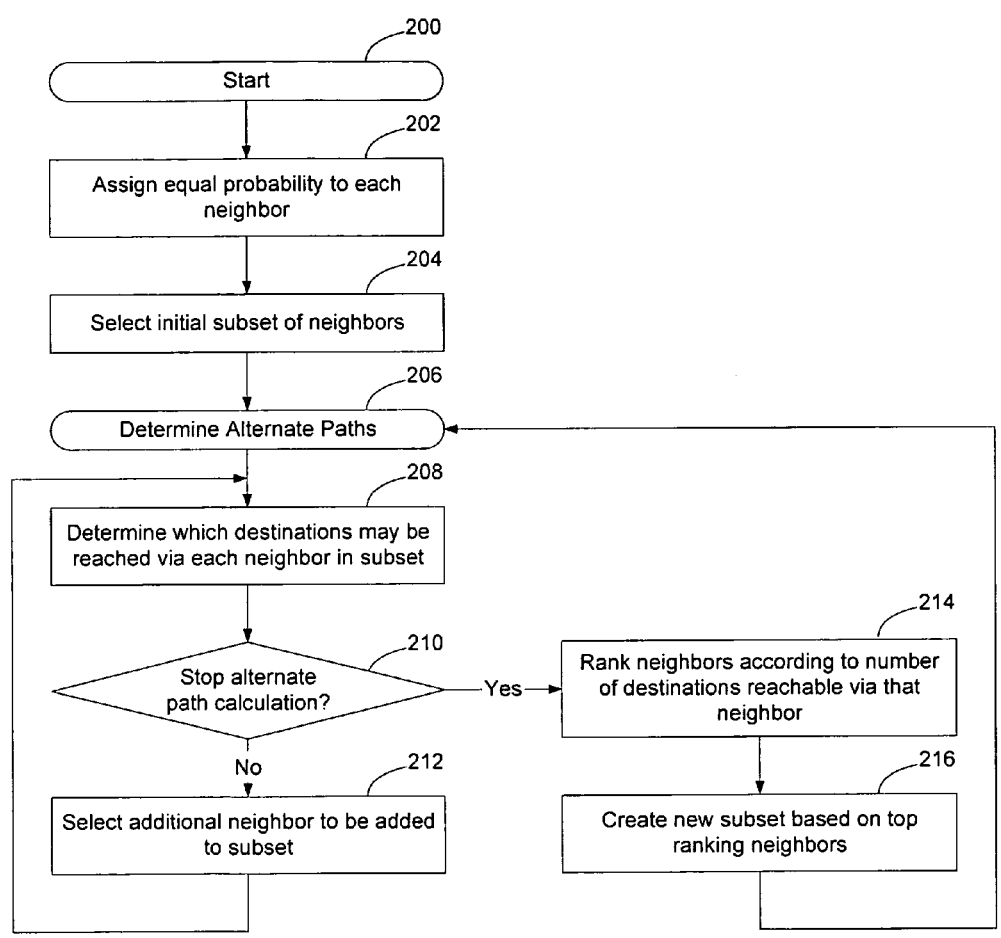
FIG. 6 is a flow chart illustrating a process of reducing the processing requirements associated with determining a set of alternate network paths according to an embodiment of the invention.

FIG. 6 illustrates a process of enabling a node to preferentially select neighbors for processing according to an embodiment of the invention. As shown in FIG. 6, when the process first starts (200) the node will not have knowledge of which neighbors are more likely to be able to provide an alternate path to a larger number of its destinations. Accordingly, the node will assign an equal probability to each neighbor (202) and then select an initial subset of neighbors for processing (204).

When the node is required to determine alternate paths to its destinations, either initially or at a later point in time (206), the node will determine which destinations may be reached via each neighbor in the subset (208). The node will then determine whether it should stop the alternate path calculation (210). For example, the node may decide to stop the alternate path calculation once it is able to reach all destinations, when it can reach a sufficient percentage of its destinations, when the number of alternate paths being determined for each neighbor considered falls below a particular threshold, when the amount of CPU time spent on the alternate path calculation process has exceeded one or more thresholds, or when there is another reason to stop the calculation.

If the alternate path calculation is not terminated, the node will select one or more additional neighbors to be added to the subset and process those nodes to determine which destinations are reachable via that new neighbor (212). Once the node decides to stop the calculation process, then the node will rank the neighbors according to the number of destinations reachable via that neighbor (214). The node will then create a new subset that includes the top ranking neighbors, or which includes those neighbors that will be used to implement alternate paths on the network for the current set of calculations (216). The process will then iterate every time it is necessary to compute alternate paths so that those neighbors that have been determined to be able to provide alternate paths to larger numbers of destinations are preferentially processed to thereby reduce the computational complexity associated with finding alternate paths by reducing the number of neighbors that must be considered in connection with performance of these calculations.

Figure 7:
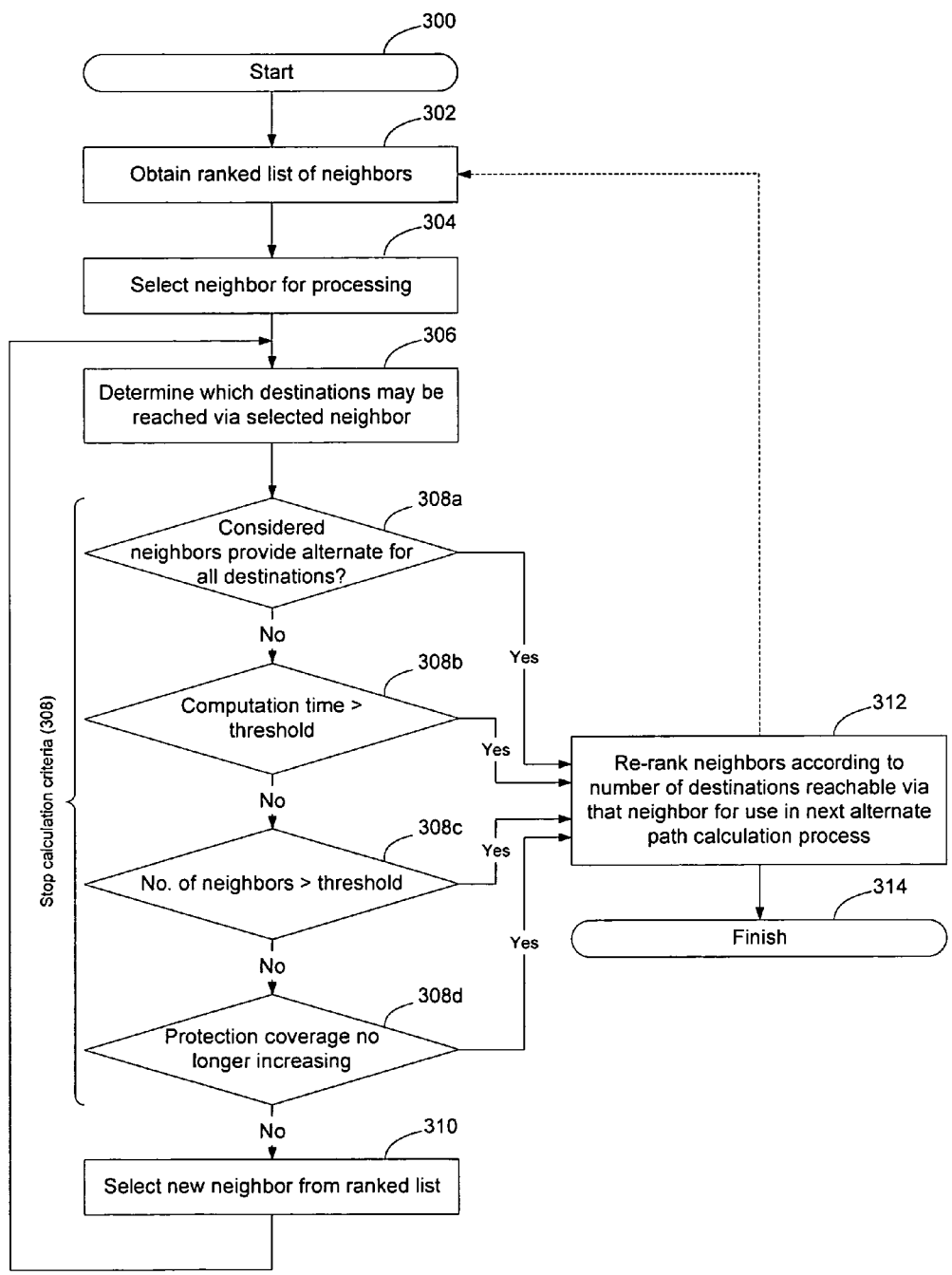
FIG. 7 is a flow chart illustrating another process of reducing the processing requirements associated with determining a set of alternate network paths according to an embodiment of the invention.

FIG. 7 shows another example of a process that may be used to calculate alternate paths through the network. In the embodiment shown in FIG. 7, when it is necessary to calculate a set of alternate paths (300), the process will obtain a ranked list of neighbors (302). The ranked list may be created when the node is first booted or otherwise brought on-line on the network, and then used during subsequent iterations of the alternate path calculation process. The ranked list may also be obtained from the updating process (312) discussed below.

From the ranked list of neighbors, the node will select an initial neighbor (304) and determine which destinations may be reached via the selected neighbor (306). Since the neighbors have been ranked in the list, the node is able to select neighbors that have historically been able to reach larger numbers of destinations.

The node will then determine whether it should stop the alternate path calculation process by determining whether one or more stop calculation criteria have been satisfied. For example, in the illustrated process, the node may determine whether the neighbors that have been considered provide alternate for all destinations (308a). The node may also consider whether the computation time spent on the alternate path calculation has exceeded a particular threshold (308b). The node may also determine whether it has considered a sufficient number of neighbors (308c) and/or whether the number of additional alternate paths being obtained per considered neighbor is below a particular threshold (308d). The determinations 308a-308d may be performed in any order, and optionally one or more of these determinations may be omitted when it is not desired to use that particular criteria to terminate the alternate path calculation process. Similarly, other stop calculation criteria may be used as well to terminate the alternate path calculation process and the invention is not limited to an embodiment that uses these particular described criteria.

If the node determines that none of the criteria have been met and that it should continue the alternate path calculation process, the node will select the next neighbor in the ranked list (310), determine which destinations may be reached by that new neighbor (306) and re-apply the stop calculation criteria (308) to determine whether the process should terminate. This process may iterate until all of the neighbors have been considered or until one of the stop calculation criteria has been met.

Once the process terminates, the node will re-rank the neighbors according to the number of destinations that were found to be reachable via that neighbor. Stated another way, each neighbor that has been considered will be assigned a preference value based on the number of alternate paths it may provide through the network. The updated ranked list will then be used during a subsequent alternate path calculation. The process will then end (314) and the alternate paths will be programmed into the data plane so that the network element may use the alternate paths upon occurrence of a failure on the network.

Figure 8:
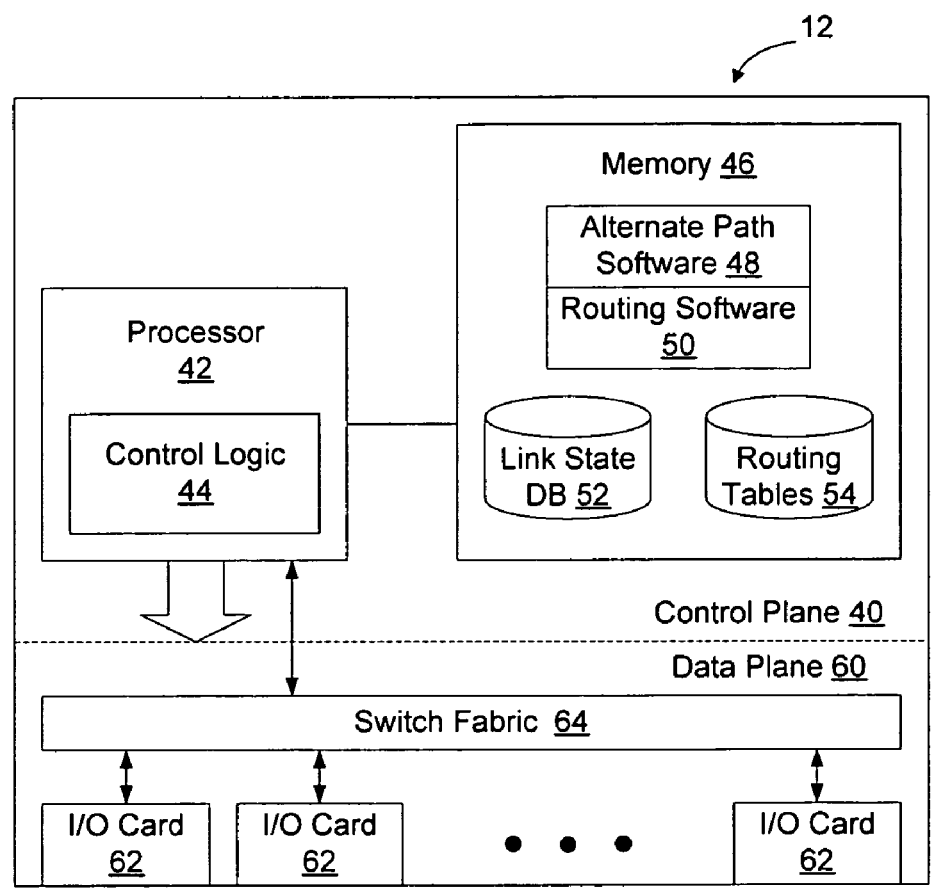
FIG. 8 is a functional block diagram of a network element according to an embodiment of the invention.

FIG. 8 illustrates a network element 12 that may be configured to implement an embodiment of the invention. As shown in FIG. 8, the network element 12 includes a control plane 40 and a data plane 60. The control plane 40 is generally configured to instruct the data plane 60 how to handle data on the network. The data plane 60 is generally configured to handle high speed data traffic, such as packet traffic on an IP network. For example, the data plane may include one or more I/O cards 62 interconnected by a switch fabric 64. Routing tables, including alternate paths determined via the alternate path calculation process described herein, may be programmed into the data plane to enable the data plane to handle data on the network. Many data plane architectures may be used in connection with the network element of FIG. 8, and the invention is not limited to a particular data plane architecture selected to implement embodiment of the invention.

The control plane 40 includes a processor 42 containing control logic 44 that is able to be programmed to enable the network element to perform the functions described herein to compute alternate paths through the network. For example, the network element may contain a memory 46 containing software such as alternate path software 48 and routing software 50 configured to enable the network element to select primary and alternate paths to destinations on the network. The memory may also contain one or more tables, such as link state database 52 that contains the data to be used by the routing software 50 and/or alternate path software 48 to enable the network element to perform the requisite computations described herein. The memory may also contain a copy of the current routing tables 54 that have been programmed into the data plane, and other information commonly maintained by the network element to enable it to function on the network. It should be understood that the invention is not limited to a network element configured in the manner discussed above, as numerous other architectures may be used to create a network element.

Although an embodiment of the invention has been described in connection with an implementation in a routed IP network, the invention is not limited in this manner as it may also be used in other networks where a link state routing protocol is being used. For example, an embodiment of the invention may be used in connection with a routing bridge (RBridge) network running a link state routing protocol such as IS-IS. Accordingly, the invention is not limited to implementation on an IP network or in a router, but may also be implemented in other types of network elements such as switches or bridges.

When computing loop free alternate paths, the method can consider a subset of neighbors as described above. Optionally, the method may be used to compute U-turn alternate paths as well by considering U-turn neighbors.

In the above-description, a method of determining when to stop alternate path calculations has been described in connection with determining which neighbors are able to provide loop-free alternate paths. The invention is not limited in this manner, however, as a similar method may be practiced in connection with determining which neighbors are able to provide U-turn alternate paths to particular destinations. For example, the node may determine which of its neighbors are capable of breaking U-turns, and then determine whether one or more of those neighbors are able to provide a U-turn alternate path to one or more of the destinations. Neighbors that are able to break U-turns may be ranked so that neighbors with a historical greater likelihood of being able to provide U-turn alternate paths are preferentially considered in this process.

The functions described above including these described with respect to FIGS. 6-7, may be implemented as one or more sets of program instructions that are stored in a computer readable memory within the network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of calculating a set of alternate network paths to a plurality of destinations on a network, the method comprising the steps of:

ranking, by a node on the network, a plurality of neighbor nodes to prioritize the neighbor nodes for alternate path processing based on historical abilities of the neighbor nodes to provide alternate paths to the plurality of destinations on the network during previous iterations of the method of calculating alternate network paths to the plurality of destinations on the network;

selecting, by the node on the network, a highest ranked neighbor node and calculating, for the highest ranked neighbor node, how many destinations the highest ranked neighbor node is able to reach via loop-free alternate network paths through the network;

determining, by the node on the network, whether a stop calculation criterion has been met;

selecting, by the node on the network, a next highest ranked neighbor node and calculating, for the next highest ranked neighbor node, how many destinations the next highest ranked neighbor node is able to reach via loop-free alternate network paths through the network;

iterating, by the node on the network, the steps of determining and selecting next highest ranked neighbor nodes until the stop calculation criterion has been met;

terminating, by the node on the network, calculating loop-free alternate network paths once loop-free alternate network paths to a sufficient number of destinations has been calculated if the stop calculation criterion has been met before considering all neighbor nodes; and wherein the stop calculation criterion is a percentage of a total number of destinations on the network fewer than 100% of possible destinations on the network.

2. The method of claim 1, wherein the step of calculating generates a number indicative of how many destinations the highest ranked neighbor node is able to serve as a loop-free alternate network path.

3. The method of claim 2, wherein the number is used to rank neighbor nodes for subsequent loop-free alternate network path calculations.

4. The method of claim 2, wherein the historical ability is associated with how many destinations the highest ranked neighbor node has been able to reach via loop free alternate network paths during earlier loop-free alternate network path calculations, each loop-free alternate network path calculation being implemented after a change in network topology causes the plurality of neighbor nodes on the network to calculate a new set of shortest paths through the network.

5. The method of claim 1, wherein the stop calculation criterion is based on a number of times the step of iterating has been performed.

6. The method of claim 1, wherein the stop calculation criterion is based on an amount of computation time expended in connection with the loop-free alternate network path calculations.

7. The method of claim 1, wherein the stop calculation criterion is based on whether a number of new loop-free alternate network paths for destinations not previously found to be reachable via the loop-free alternate network paths through other previously considered higher ranked neighbor nodes being found for each new neighbor node being considered has passed below a threshold.

8. The method of claim 1, further comprising the step of re-ranking, by the node on the network, the neighbor nodes upon determining that a stop calculation criterion has been met.

9. The method of claim 1, wherein the step of determining whether a stop calculation criterion has been met comprises determining whether at least one of a plurality of stop calculation criteria has been met, and wherein the step of iterating comprises iterating until at least one of the stop calculation criteria has been met.

10. The method of claim 1, wherein at least some of the loop-free alternate network paths include U-turn alternate network paths.

11. A method of computing alternate network paths on an Internet Protocol (IP) network by a node on the network, the method comprising the steps of:
   ranking, by a node on the network, a plurality of neighbor nodes to prioritize the neighbor nodes for alternate path processing based on historical abilities of the neighbor nodes to provide alternate paths to the plurality of destinations on the network during previous iterations of the method of calculating alternate network paths to the plurality of destinations on the network;
   selecting, by the node on the network, a highest ranked neighbor node and calculating, for the highest ranked neighbor node, how many destinations the highest ranked neighbor node is able to reach via loop-free alternate network paths through the network;
   determining, by the node on the network, whether a stop calculation criterion has been met;
   selecting, by the node on the network, a next highest ranked neighbor node and calculating, for the next highest ranked neighbor node, how many destinations the next highest ranked neighbor node is able to reach via loop-free alternate network paths through the network;
   iterating, by the node on the network, the steps of determining and selecting next highest ranked neighbor nodes until the stop calculation criterion has been met;
   terminating, by the node on the network, calculating loop-free alternate network paths once loop-free alternate network paths to a sufficient number of destinations has been calculated if the stop calculation criterion has been met before considering all neighbor nodes; and
   wherein the stop calculation criterion is a percentage of a total number of destinations on the network fewer than 100% of possible destinations on the network.

12. The method of claim 11, wherein the step of ranking comprises causing historical contributions associated with the historical abilities to decay over time.

13. A network element configured to compute alternate network paths on an IP network, the network element containing a computer readable memory containing control logic which, when loaded into a processor, configures the processor to implement a method comprising the steps of:
   ranking a plurality of neighbor nodes to prioritize the neighbor nodes for alternate path processing based on historical abilities of the neighbor nodes to provide alternate paths to the plurality of destinations on the network during previous iterations of the method of calculating alternate network paths to the plurality of destinations on the network;
   selecting a highest ranked neighbor node and calculating, for the highest ranked neighbor node, how many destinations the highest ranked neighbor node is able to reach via loop-free alternate network paths through the network;
   determining whether a stop calculation criterion has been met;
   selecting a next highest ranked neighbor node and calculating, for the next highest ranked neighbor node, how many destinations the next highest ranked neighbor node is able to reach via loop-free alternate network paths through the network;
   iterating the steps of determining and selecting next highest ranked neighbor nodes until the stop calculation criterion has been met;
   terminating calculating loop-free alternate network paths once loop-free alternate network paths to a sufficient number of destinations has been calculated if the stop calculation criterion has been met before considering all neighbor nodes; and
   wherein the stop calculation criterion is a percentage of a total number of destinations on the network fewer than 100% of possible destinations on the network.

14. The network element of claim 13, further comprising:
   a data plane configured to handle IP packets on the IP network, and wherein the processor is configured to cause the loop-free alternate network paths to be programmed into the data plane for use upon occurrence of a failure on the IP network.

15. The network element of claim 13, wherein the control logic is configured to stop calculating loop-free alternate network paths by applying a plurality of stop calculation criteria.

16. The network element of claim 15, wherein any one of the plurality of stop calculation criteria will cause the control logic to stop computing loop-free alternate network paths, and wherein the criteria comprise:
   whether a computation time has exceeded a first threshold;
   whether a number of neighbor nodes considered has exceeded a second threshold; and
   whether loop-free alternate network paths for fewer than all destinations but more than a third threshold number of destinations have been found.

17. The network element of claim 13, wherein the control logic is configured to re-rank the neighbor nodes according to a new number of destinations the neighbor nodes are able to reach as loop-free alternate network paths as determined in a most recent process of computing loop-free alternate network paths.

18. The network element of claim 13, wherein at least one of the loop-free alternate network paths is a U-turn alternate network path.

* * * * *